United States Patent [19]

Turner

[11] 4,362,950

[45] Dec. 7, 1982

[54] SYNCHRONOUS INVERTER COMPATIBLE WITH COMMERCIAL POWER

[76] Inventor: Joe S. Turner, 2825 S. Washington Ave., Apt. No. 614, Titusville, Fla. 32780

[21] Appl. No.: 295,994

[22] Filed: Aug. 25, 1981

[51] Int. Cl.³ .............................................. H02J 3/46
[52] U.S. Cl. ....................................... 307/45; 307/87; 307/326
[58] Field of Search .................................. 307/44–45, 307/51, 64, 66, 85–87, 326

[56] References Cited

U.S. PATENT DOCUMENTS

| | | | |
|---|---|---|---|
| 3,909,621 | 9/1975 | Nollace et al. | 307/87 X |
| 4,010,381 | 3/1977 | Fickescher et al. | 307/66 |
| 4,104,539 | 8/1978 | Hase | 307/66 X |
| 4,180,745 | 12/1979 | Bartlett et al. | 307/87 X |

Primary Examiner—William M. Shoop
Assistant Examiner—Peter S. Wong

[57] ABSTRACT

A synchronous inverter combines direct current energy from a minor source, such as a wind driven generator, with alternating current energy from a commercial power source, in a home electrical distribution system. This inverter uses a linear audio amplifier to produce an alternating current voltage that is continuously essentially the same as the commerical power voltage in voltage wave shape, amplitude, phase and frequency. The amplifier energy level output is controlled by the voltage level from the minor energy source. The compatibility of the inverter with commercial power permits connection of the inverter by merely plugging its power cord male plug into a selected home electrical distribution system female receptacle.

1 Claim, 2 Drawing Figures

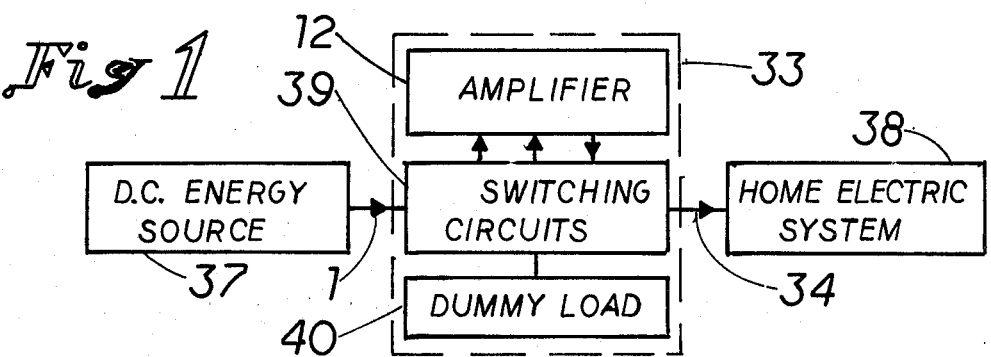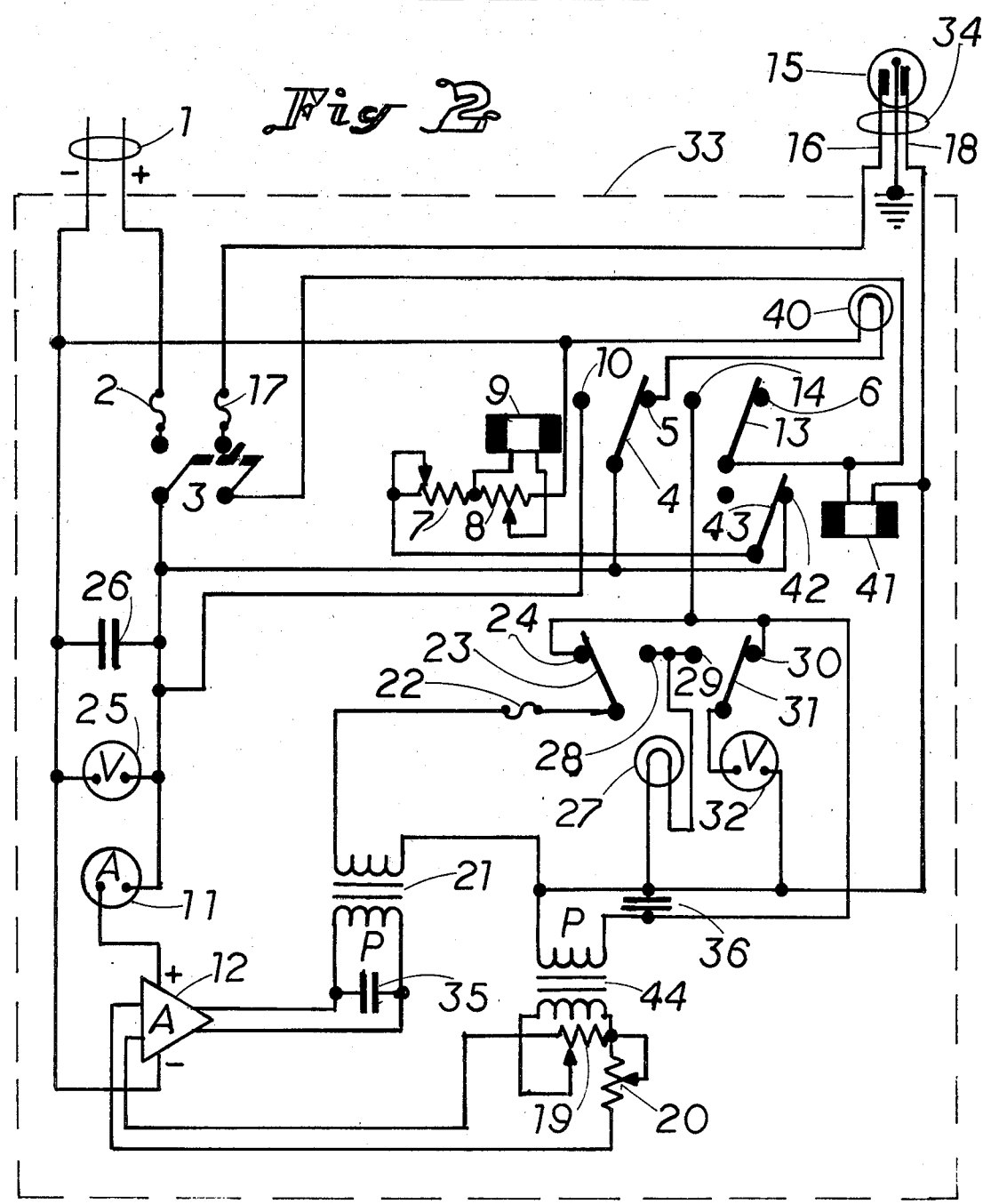

SYNCHRONOUS INVERTER COMPATIBLE WITH COMMERCIAL POWER

FIELD OF THE INVENTION

This invention relates to energy transfer systems that convert direct current electrical energy from minor sources, such as wind-driven generators and banks of photovoltaic cells, to alternating current energy for use in homes, and more particularly to compatible load sharing between minor energy sources and commercial power.

SUMMARY OF THE INVENTION

Conventional methods for converting direct current energy to alternating current energy, by means of Synchronous Converters for home use, fail to provide a voltage wave shape that is continuously identical to that of the commercial power, and undesireable energy wasting circulating currents result from this mismatch. Conventional Synchronous Inverters create a hazard by feeding voltage into the commercial power systems under certain power failure conditions, when power company service personnel are working on the power distribution system.

It is an object of my invention to provide apparatus that employs a conventional low audio frequency amplifier in a novel circuit configuration to convert direct current energy into an alternating current voltage that automatically and continuously matches the voltage level, voltage wave-shape, phase and frequency of a commercial power voltage source, to which the amplifier input and output are connected in normal operation.

Another object of my invention is to provide an amplifier controlled inverter that will be automatically disconnected from the commercial power circuits when there is a failure of the commercial power, in order to avoid injuries to power company employees working on the power lines.

Yet another object is to employ a linear amplifier to automatically transfer energy from a minor source to the home electrical circuits in direct proportion to the level of direct current energy available from the minor source.

A still further object is to provide a switching circuit that connects the inverter to the home electrical distribution system only when the minor energy source is generating sufficient energy to permit transfer of energy from the minor source to the home circuits, and only when the electrical currents in the inverter are within acceptabler limits.

More specifically stated, it is an object of my invention to provide apparatus that employs an electronic amplifier and switching circuits to convert direct current electrical energy from a minor source; such as a wind-driven or solar heat-powered generator, a bank of photovoltaic cells, a small hydroelectric powered generator, or an exercise-machine driven generator; to alternating current energy for use in appliances and lights in a home. This invention serves as a suplement to, rather than a substitute for, a highly reliable commercial power system, and eliminates the need for expensive and troublesome storage batteries, as well as expensive frequency generators, required by standby power systems and non-synchronous inverters. The amplifier input is a low level from the commercial power, that is amplified and fed back into the home electrical circuits in parallel with the commercial power, and energy for this amplification is provided by the direct current from the minor energy source. This results in the conversion of the direct current energy to alternating current that is completely compatible with the commercial power, including the voltage waveshape. This configuration also results in the novel condition wherein the amplifier input is derived from its output circuit, which is possible due to the stability and high effective impedance of the commercial power system presented to the amplifier output. For a typical home minor energy system, this simple compatible synchronous inverter is installed by connecting it to the minor energy source by a two conductor cable, and merely plugging its power cord into a house convenience outlet as would be done with a floor lamp or a television set. Operation is entirely automatic, and energy is fed into the house power distribution circuits when the direct current voltage from the minor energy source is above a predetermined low level. The house electrical power meter will only record the amount of electrical energy furnished by the power company, and thus in effect will deduct the amount of energy furnished by the minor source for the monthly meter reading. The inverter automatically disconnects from the home electrical circuits when there is a commercial power failure, thus avoiding a possible danger to power company employees who might be working on power lines.

Other objects and many of the attendant advantages of this invention are explained by reference to the following detailed description which is illustrated by the accompanying drawings wherein:

REFERENCE TO DRAWINGS

FIG. 1 illustrates in block diagram the application of this invention to a home minor energy source.

FIG. 2 is a schematic diagram of the basic circuit of a preferred embodiment of my invention.

DETAILED DESCRIPTION

The FIG. 1 block diagram shows a minor energy source 37, such as a wind-driven generator, that is connected to the compatible synchronous inverter by a two conductor cable 1. When only a very small amount of energy is available from 37, the switching circuits 39 of the inverter 33, that may be a microprocessor controlled switching circuit or a simple voltage sensitive relay switching circuit, keep the output of the minor energy source connected to a dummy load 40 which is a lamp of a voltage and wattage rating sufficient to permit the lamp to absorb the output of 37. When the switching circuits perform this function, they also keep the input and output circuits of the amplifier disconnected from the house and commercial power circuit. When the energy from 37 increases to a predetermined level, that is just enough to cause energy to be transferred from the amplifier output into the house circuit, switching circuits 39 transfer the output of 37 from the dummy load 40 to the amplifier 12, and at the same time connect the input and output circuits of amplifier 12 to the house electrical load in parallel with the commercial power. The linear amplifier 12 accepts a small input signal from the commercial power, amplifies this signal to match the commercial power voltage by using the direct current minor energy source power, and feeds its output into the house electrical load in parallel with energy furnished by commercial power. The amount of energy flowing from the amplifier to the house electrical load is proportional to the direct current energy available from the minor energy source 37. When the voltage level from 37 drops below the value required for transfer of energy from the amplifier to the house circuits, the switching circuits 39 disconnect amplifier 12 input and output circuits from the house circuits and at the same time transfer the output of the minor energy source from the amplifier 12 to the dummy load 40.

A preferred embodiment of the invention is illustrated in the FIG. 2 schematic diagram. The two conductor cable conduits direct current energy from a minor source into the compatible synchronous inverter 33, with the negative side of this circuit through cable 1 being connected to filter capacitor 26, voltmeter 25, amplifier 12, adjustable resistor 8, the coil of voltage sensative relay 9 and dummy load lamp 40.

When available energy from the minor source is very low, direct current from the positive conductor of cable 1 flows through fuse 2, that serves to protect the inverter from overloads, through the left hand arm of double-pole single-throw disconnect switch 3 through contacts 42 and 43 of alternating current relay 41 to adjustable resistor 7, and at the same time from switch 3 to moveable contact 4 of relay 9, and to filter capacitor 26. This positive circuit is further connected through fixed contact 5 of relay 9 to the direct current dummy load lamp 40 which stabilizes the voltage from the minor source during the time that there is insufficient energy available for operation of the inverter. The flow of current through resistor 7 to the coil of relay 9 and resistor 8 is insufficient to energize relay 9.

When the direct current energy source voltage increases above the low value considered above, to a level that will permit operation of the inverter, which is that level resulting in energy flow from amplifier 12 into the house circuits, resistors 7 and 8 permit sufficient current to flow through the coil of relay 9 to activate this relay. Activation of relay 9 causes moveable contact 4 to transfer the output of the minor energy source from the dummy load to relay contact 10 and thence to voltmeter 25 and through ammeter 11 to amplifier 12. At the same time, moveable contact 13 completes the alternating current circuit from the house load through power cord 34 conductor 16, through fuse 17 which protects the inverter from overload, through the right hand arm of disconnect switch 3, to the coil of alternating current relay 41, to contacts 13 and 14 of relay 9 thence to the primary of transformer 49, and to single-pole single throw maintenance service switch 23 hence to the amplifier output circuit protective fuse 22, thence to the secondary of amplifier output transformer 21. The alternating current circuits of the primary of transformer 44 and the secondary of transformer 21 are completed through conductor 18 of power cord 34. Amplifier 12 now has direct current operating power from the minor energy source, an input voltage from the commercial power through transformer 44, and its output is connected to the house load through transformer 21. Amplifier 12 now uses energy from the minor source to amplify the low level input from the commercial power and to feed energy into the house load in parallel with energy from the commercial power. Due to the settings of resistors 19 and 20 and the characteristics of amplifier 12, this transfer of energy from the minor energy source to the house load is proportional to the voltage level from the minor source.

When the compatible synchronous inverter is operating as above, and the output of the minor energy source drops below a predetermined level where the energy flow from the amplifier 12 to the house load is reduced to near zero, the voltage to the coil of relay 9 reaches the release level for this relay and the contacts of relay 9 return to their normally open positions. This results in the amplifier being disconnected from the commercial power, and from the minor energy source. At the same time, the dummy load lamp 40 is reconnected to the minor energy source.

In case of a commercial power failure when available energy from the minor source is too low to permit operation of the inverter, the commercial power failure will result in the release of alternating current relay 41, and the opening of contacts 42 and 43 of that relay which will prevent relay 9 from being energized for the duration of the power outage, and prevent the inverter from feeding energy into the commercial power system until the commercial power service is restored.

In case of a commercial power failure when the inverter is feeding energy into the house load, and the load on the inverter with no commercial power available is in excess of the inverter's capacity, it will not be able to provide sufficient voltage to keep relay 41 energized. The contacts 42 and 43 of this relay will separate, with the result that relay 9 will release and the inverter will not be able to feed energy into the house load until commercial power service is restored.

In case of a power failure when the inverter is feeding energy into the house load, and the load on the inverter with no commercial power available is within its capacity, the fact that amplifier 12 has its input coupled to its output will result in feedback with regenerative oscillation in the amplifier. This will cause an overload on the overload protective circuit in the amplifier or on fuse 2, and there will be an interuption of the direct current energy flow to the amplifier which will cause elimination of voltage from the amplifier to the coil of relay 41. The resulting release of contacts 42 and 43 will prevent operation of relay 9, and there will be no energy flow from the inverter to the commercial power system.

When the compatible synchronous inverter is assembled, production tests are made with a kilowatt-hour meter connected between cable plug 15 and the commercial power, with an adjustable direct current power source connected to cable 1, with service switch 23 in contact with 28, and with service switch 31 contacting 30. Resistors 7, 8 and 20 are set to insert minimum resistance in series with 9 and 44, and resistor 19 is set at midposition. The adjustable energy source is set to deliver the rated full load voltage for the inverter. The commercial power voltage indicated by 32 is recorded, and then switch 31 is moved to contact 29. Adjustments are made for resistors 19 and 20 to provide the inverter voltage reading by 32 as was recorded for the commercial power. This adjustment is made with resistor 19 being used for coarse adjustments and 20 for fine adjustments, with the setting of 20 as near the minimum inserted resistance as practical.

A 300 volt alternating current voltmeter is connected between contacts 24 and 28 of switch 23, and if the voltage reading is near twice the commercial power voltage, either the input or the output connections to amplifier 12 must be exchanged. If the meeter reading is near zero, then switch 23 is moved to contact 24 and switch 31 to 30. The adjustable direct current source is set to result in full rated power flow from the inverter to the commercial power circuit, as shown by the kilo-watt-hour meter disk rotation rate. The direct current voltage level and current flow, the alternating current voltage and the rate of power transfer to the commercial power circuit are recorded. The direct current voltage level is then reduced to the point that the flow of energy from the inverter to the commercial power circuit is reduced to near zero, and resistors 7 and 8 are adjusted to cause relay 9 to release. The direct current voltage and current input to the inverter, the commercial power voltage and the rate of power flow from the inverter are recorded for this condition. Resistor 8 is used for coarse and resistor 7 for fine adjustments in this step. The voltage of the adjustable direct current source is now slowly increased until relay 9 contacts close, and the voltages, current and power flow are recorded for this condition.

Amplifier 12 is a low audio frequency linear amplifier of the type used for the last two stages of conventional non-synchronous inverters, with the following characteristics: output of the same frequency, phase and wave shape as the input voltage; output power varies as the voltage level of the direct current power source for the amplifier varies; and output voltage level varies as the input signal from the commercial power varies. The amplifier uses a form of direct coupling between stages in order to avoid introducing any phase shift, and capacitors 35 and 36 are used to prevent the introduction of phase shift by the inductance of transformers 44 and 21. Other amplifiers may be used in this system, including transformerless amplifiers when sufficient voltage is available form the minor source for operation of such amplifiers. If the amplifier used in the compatible synchronous inverter is not protected by an internal thermal overload circuit interuptor, fuse 2 should be replaced by a fast acting circuit interuptor. The schematic diagram of FIG. 2 may be simplified by replacing voltmeter 25, switches 23 and 31, dummy load 27 and voltmeter 32 with designated test points and test links.

What is claimed is:

1. In a method for combining direct current energy from a minor source means with alternating current energy from a commercial power energy source to a home electrical distribution system, a compatible synchronous inverter means comprising an audio amplifier means, alternating current power cord male plug means and a switching circuit means for controlling said amplifier means and a dummy load, said minor source means having a direct current scale means and said distribution system having female receptacle means, said method for combining is accomplished in a compatible manner by using parallel connections and avoiding any series connections or disturbances to the commercial power source wiring to the home, said method comprising the steps of:
   A. installing said inverter means by inserting said male plug means into a selected female receptacle means of the home electrical distribution system, and connecting said cable means for said minor source means to said inverter means,
   B. connecting the output of said amplifier means to said home electrical distribution system, and further connecting said direct current energy from said minor source means for supplying power to said amplifier means,
   C. detecting the direct current voltage available from said minor source means in accordance with a predetermined voltage range suitable for operation of said amplifier means, and disconnecting the input and output circuits of said amplifier means when said direct current voltage is not within said predetermined voltage range,
   D. providing a small amount of alternating current voltage frm said home electrical distribution system as an input signal to said amplifier means to produce an output that is essentially the same in wave-shape, amplitude, phase and frequency as said input signal,
   E. connecting a dummy load to the output of said amplifier means at all times when said output is not connected to said home electrical distribution system, and disconnecting said dummy load after said output is connected to said home electrical distribution system.

* * * * *

UNITED STATES PATENT AND TRADEMARK OFFICE
CERTIFICATE OF CORRECTION

PATENT NO. : 4,362,950
DATED : Dec. 7, 1982
INVENTOR(S) : Joe S. Turner

It is certified that error appears in the above-identified patent and that said Letters Patent are hereby corrected as shown below:

Column 3, line 50, change "49" to --44--

Column 6, line 6, change "scale" to --cable--

Column 6, line 32, change "frm" to --from--

Signed and Sealed this

Twenty-sixth Day of April 1983

[SEAL]

Attest:

GERALD J. MOSSINGHOFF

Attesting Officer

Commissioner of Patents and Trademarks